United States Patent
Niida et al.

(10) Patent No.: US 6,969,187 B2
(45) Date of Patent: Nov. 29, 2005

(54) LIGHT GUIDING PLATE FOR FRONT LIGHT

(75) Inventors: Eiki Niida, Kariya (JP); Fumikazu Isogai, Kariya (JP); Yasuya Mita, Kariya (JP); Norihito Takeuchi, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 10/304,623

(22) Filed: Nov. 26, 2002

(65) Prior Publication Data

US 2005/0099788 A1    May 12, 2005

(30) Foreign Application Priority Data

Nov. 30, 2001    (JP) .............................. 2001-365745

(51) Int. Cl.⁷ ................................................. F21V 7/04
(52) U.S. Cl. ...................... 362/603; 362/619; 362/620; 362/626; 362/628; 349/63
(58) Field of Search ............................... 362/603, 619, 362/620, 626, 628, 23, 26, 600, 602, 615, 362/617, 623; 385/129, 130; 349/63, 56, 349/61, 62

(56) References Cited

FOREIGN PATENT DOCUMENTS

| JP | 7-270709 | 10/1995 | .......... G02B 27/00 |
| JP | 8-278760 | 10/1996 | .......... G09F 13/18 |
| JP | 11-242220 | 9/1999 | ......... G02F 1/1335 |
| JP | 2000-011723 | 1/2000 | ............. F21V 8/00 |
| JP | 2000-21224 | 1/2000 | ............. F21V 8/00 |
| JP | 2000-111900 | 4/2000 | ......... G02F 1/1335 |
| KR | 2001-69938 | 7/2001 | ....... G02F 1/13357 |

*Primary Examiner*—Thomas M. Sember
*Assistant Examiner*—Ismael Negron
(74) *Attorney, Agent, or Firm*—Morgan & Finnegan, LLP

(57) ABSTRACT

A light guiding plate guides light from a light source and irradiates the light onto a display portion. The light guiding plate has an exit plate facing the display portion, and a reflection-exit plane opposite to the exit plane. The reflection-exit plane has a first end intersecting an incidence plane and a second end intersecting an opposite end plane. An inclination angle, defined by the exit plane and a line that contains the first end and the second end, is greater than 0.20° and less than 0.75°. The reflection-exit plane includes a light admission portion that reflects light entering through or reflected on the incidence plane to the exit plane.

19 Claims, 3 Drawing Sheets

LIGHT GUIDING PLATE FOR FRONT LIGHT

BACKGROUND OF THE INVENTION

The present invention relates to a light guiding plate for a front light mounted on a reflective display unit.

To reduce the power consumption, some conventional display units have a front light. When the outside light is sufficient, this type of display unit uses outside light such as sunlight and room lightening. When the outside light is insufficient, the display unit uses the front light. Such display units include a reflective display unit with a front light.

FIG. 5(a) shows a prior art reflective liquid crystal display unit 51 having a front light 53. The display unit 51 includes a reflective liquid crystal panel 52. The front light 53 faces the liquid crystal panel 52. The front light 53 includes a light guiding plate 54, and a light source 55 facing one end (incidence plane) 54a of the light guiding plate 54. The thickness of the light guiding plate 54 is substantially uniform. An exit plane 54b of the light guiding plate 54 faces the liquid crystal panel 52 on a reflection-exit plane 54d, which is opposite to the exit plane 54b, grooves (not shown) are formed to reflect light from the light source 55 to the exit plane 54b. The light from the light source 55 into the light guiding plate 54 through the incidence plane 54a is guided through the light guiding plate 54 while being totally reflected. The light is then radiated onto the liquid crystal panel 52 through the exit plane 54b.

FIG. 5(b) shows another prior art reflective liquid crystal display unit 151. The display unit 151 includes a wedge plate type light guiding plate 154. The thickness of the light guiding plate 154 gradually decreases from an incidence plane 154a to an opposite end plane 154c. Other than the light guiding plate 154, the structure of the display unit 151 is the same as the display unit 51 of FIG. 5(a).

To improve the visibility of the liquid crystal panel 52, the light guiding plates 54, 154 are designed to guarantee the brightness. A less amount of incident of incident light escapes from the wedge type light guiding plate 154 through the opposite end plane 54c, which is opposite to the incidence plane 54a, compared to the flat plate type light guiding plate 54 shown in FIG. 5(a). Compared to the flat plate type light guiding plate 54, the wedge type light guiding plate 154 has more uniform brightness (refer to Japanese Laid Open Patent Publication No. 11-242220).

The brightness of a flat type light guiding plate 54 is improved by deepening the grooves. However, excessive depth makes the grooves visible and therefore degrades the visibility of the display unit. The wedge type light guiding plate 154, on the other hand, easily improves the brightness compared to the flat plate type light guiding plate 54. However, if the thickness of the waveguide 154 at the incidence plane 54a and the thickness at the opposite end plane 54c are significantly different, that is, if the angle θ defined by the reflection-exit plane 54d and the exit plane 54b is large, parallax is produced. This results in a double image. A ray L1 escapes from the light guiding plate 154 through the exit plane 54b and is reflected by the liquid crystal panel 52. Then, the ray L1 reenters the light guiding plate 154 and exits through the reflection-exit plane 54d. Part of the ray L1 is reflected by the reflection-exit plane 54d. The reflected part of the ray L1 is reflected by the exit plane 54b and exits the light guiding plate 154 through the reflection-exit plane 54d. This portion of the ray L1 is expressed by L2 in FIG. 6. As a result, the image on the display 52 is doubled.

If the inclination angle θ is not appropriate, the brightness will be uneven. That is, a uniform brightness cannot be obtained. Japanese Laid Open Patent Publication No. 11-242220 discloses that wedge plate type light guiding plate improves the uniformity of the brightness. However, the publication does not disclose the relationship of the inclination angle 0 to the parallax and a uniform brightness distribution.

SUMMARY OF THE INVENTION

Accordingly, it is an objective of the present invention to provide a light guiding plate for front light that minimizes the parallax to an invisible level to improve the visibility while improving the uniformity of the brightness distribution.

To achieve the foregoing and other objectives and in accordance with the purpose of the present invention, the invention provides a light guiding plate for a front light mounted on a reflective display unit having a display portion. The light guiding plate guides light from a light source and irradiates the light onto the display portion. The light guiding plate has an incidence plane, an opposite end plane, an exit plane facing the display portion and a reflection-exit plane. The incidence plane permits light to enter the light guiding plate. The opposite end plane opposites from the incidence plane. Light entering the light guiding plate through the incidence plane exits through the exit plane toward the display portion. The reflection-exit plane opposites from the exit plane. Light reflected on the display portion passes through the exit plane and the reflection-exit plane. The reflection-exit plane has a first end intersecting the incidence plane and a second end intersecting the opposite end plane. An inclination angle defined by the incidence plane and a line that contains the first end and the second end is greater than 0.2° and less than 0.75°. The reflection-exit plane includes a light admission portion that reflects light entering through or reflected on the incidence plane to the exit plane.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawing in which.

DETAILED DESCRIPTION OF THE PREFERRED EMBODIMENTS

Figure 1:
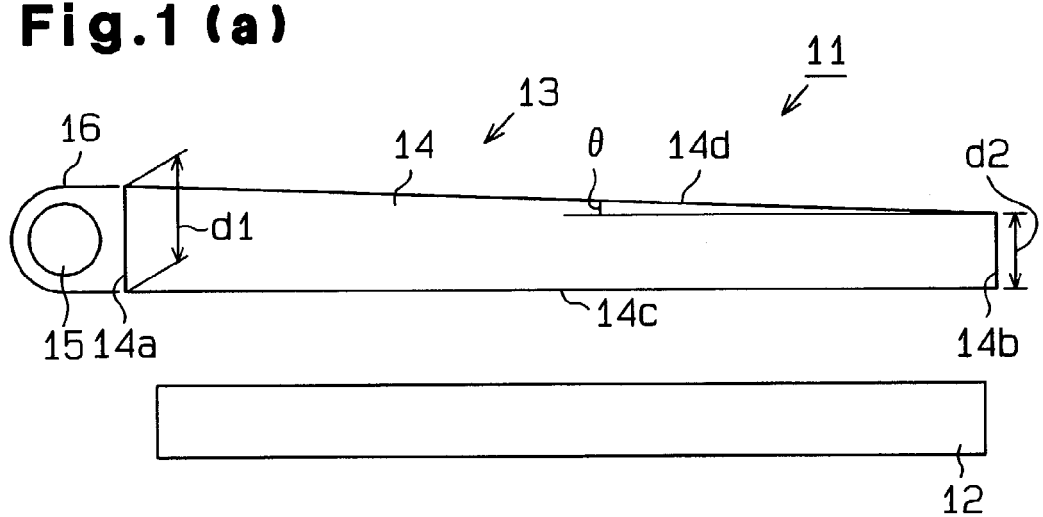
FIG. 1(a) is a diagrammatic side view showing a liquid crystal display unit according to one embodiment of the present invention.
FIG. 1(b) is a partially enlarged view showing the unit of FIG. 1(a)
Figure 1:
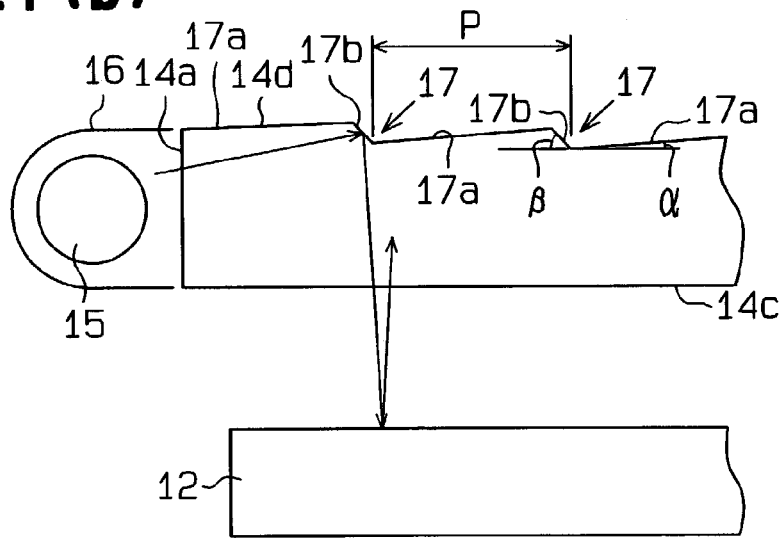

A reflective liquid crystal display unit 11 according to one embodiment of the present invention will now be described with reference to FIGS. 1(a) and 1(b). FIG. 1(a) is a diagrammatic view showing the arrangement of a liquid crystal panel 12 and a front light 13 of the display unit 11. FIG. 1(b) is a partially enlarged view of FIG. 1(a).

As shown in FIG. 1(a), the display unit 11 includes a display portion and a front light 13. In this embodiment, the display portion is the liquid crystal panel 12. The front light 13 covers the front surface (upper surface as viewed in FIG. 1(a)) of the liquid crystal panel 12. The front light 13 includes a light guiding plate 14, a light source 15, a reflector 16. The light guiding plate 14 guides light to the liquid crystal panel 12. The reflector 16 reflects light from the light source 15 toward the liquid guiding plate 14.

For example, a cold cathode tube (fluorescence tube) is used as the light source 15. A high transparency material, for example, a rectangular acrylic sheet is used as the light guiding plate 14. The light guiding plate 14 is substantially shaped as a wedge. The light guiding plate 14 has an incidence plane 14a facing the light source 15, and an opposite end plane 14b, which is located opposite to the incidence plane 14a. The length d1 of the incidence plane 14a is longer than the length d2 of the opposite end plane 14b. That is, the thickness of the waveguide 14 gradually decreases from the incidence plane 14a toward the opposite end plane 14b. The incidence plane 14a extends in a direction perpendicular to the surface of the sheet of the drawing. An exit plane 14c of the light guiding plate 14, which face the liquid crystal panel 12, is perpendicular to the incidence plane 14a. One of the ends of the reflection-exit plan 14d that intersects the incidence plane 14a is referred to as first end. The other end of the reflection-exit plane 14d, which intersects the opposite end plane 14b is referred to as a second end. The angle θ defined by the exit plane 14c and a line that contains the first end and the second end in the range of $0.2° < \theta < 0.75°$.

As shown In FIG. 1(b), a number of grooves 17 are formed on the reflection-exit plane 14d, which is opposite to the exit plane 14c. The grooves 17 reflect light entering the light guiding plate through the incidence plane 14a and guide light from the incidence plane 14a toward the exit plane 14c. Each groove 17 extends parallel to the incidence plane 14a. Each groove 17 has a first inclined plane 17a and a second inclined plane 17b. The second inclined plane 17b functions as a light admission plane. The first inclined plane 17a is inclined such that the distance between the exit plane 14c and the reflection-exit plane 14d increased from the end closer to the incidence plane 14a to the end closer to the opposite end plane 14b. The second inclined plane 17b is inclined such that the distance between the exit plane 14c and the reflection-exit plane 14d decrease from the end closer to the incidence plane 14a to the end closer to the opposite end plane 14b. The first inclined planes 17a and the second inclined planes 17b are arranged alternately. That is, in this embodiment, the grooves 17 have a saw-tooth cross-section.

The angle of the second inclined planes 17b is determined such that each second inclined plane 17b totally reflects light entering through or reflected on the incidence plane 14a toward the exit plane 14c at an angle that is close to a fight angle relative to the exit plane 14c. The angle α defined by the first inclined planes 17a and a plane parallel to the exit plane 14c is set, for example, between 1° and 5°. The angle β defined by the second inclined planes 17b and the plane parallel to the exit plane 14c is set, for example, between 41° and 47°.

The pitch P of the grooves 17 is set, for example, equal to the pixel pitch of the liquid crystal panel 12. As shown in FIG. 1(b), the pitch P of the grooves 17 refers to the distance between the bottom of one of the groove 17 and the bottom of the adjacent groove 17. The depth of the grooves 17 is increased as the distance from the incidence plane 14a increases. In this embodiment, the bottoms of the grooves 17 are spaced at equal intervals.

The pitch of the grooves 17 is actually no more than 1 mm, and the number of the grooves 17 is considerable. However, in FIG. 1(a), the grooves 17 are not illustrated. In FIG. 1(b), a reduced number of the grooves 17 are shown in a schematic manner. To facilitate illustration, the proportions of the light source 15, the light guiding plate 14 and the liquid crystal panel 12 are different in FIGS. 1(a) and 1(b).

The operation of the display unit 11 will now be described. When the outside is sufficiently bright, the display unit 11 uses, for example, sunlight or room lighting. When the outside is not sufficiently bright, the display unit 11 uses the light source 15. The outside light enters the light guiding plate 14 through the reflection-exit plane 14d. The outside light then exits the light guiding plate 14 through the exit plane 14c and is irradiated onto the liquid crystal panel 12.

When the light source 15 is used, the light advances through the light guiding plate 14 as shown in FIG. 1(b). Light that reaches each second inclined plane 17b is totally reflected at an angle that is close to a right angle relative to the exit plane 14c and exits through the exit plane 14c. The light irradiated onto the liquid crystal panel 12 is reflected by the panel 12 and reenters the light guiding plate 14. The light then passes through the light guiding plate 14 and exits the light guiding plate 14 through the reflection-exit plane 14d. The light then becomes visible.

In a macroscopic view, the thickness of the light guiding plate 14 decreased from the incidence plane 14a toward the opposite end plane 14b. Thus, compared to a flat light guiding plate having a uniform thickness, less ratio of light that enters the light guiding plate 14 through the incidence plane 14a exits the light guiding plate 14 through the opposite end plane 14b. As the distance from the light source 15 increases, the ratio of the depth of the groove 17 to the thickness of the light guiding plate 14 increases. Therefore, even if the grooves 17 are relatively shallow, the brightness of the display unit 11 is increased. Even if the depth of the grooves 17 formed in the reflection-exit plane 14d is set shallower than a case of a light guiding plate having a uniform thickness, a sufficient amount of brightness is obtained. As the inclination angle θ is increased, the brightness is increased. However, if the inclination angle θ is excessive, the brightness of the region far from the light source 15 is excessively increased and the brightness will be uneven. The inclination angle 0 therefore has an appropriate range.

The brightness uniformity is an index that represents the brightness distribution. The brightness uniformity is computed in the following manner. First, the surface of the light guiding plate 14 is divided into sixteen sections by three parallel lines and another three lines perpendicular to the first three lines. The brightness at each of the nine intersection points is measured. Then, the minimum brightness is divided by the maximum brightness. The resultant represents the brightness uniformity. The closer to one the value is, the smaller the difference between the minimum brightness and the maximum brightness is, that is, the more uniform the brightness distribution is.

Figure 3:
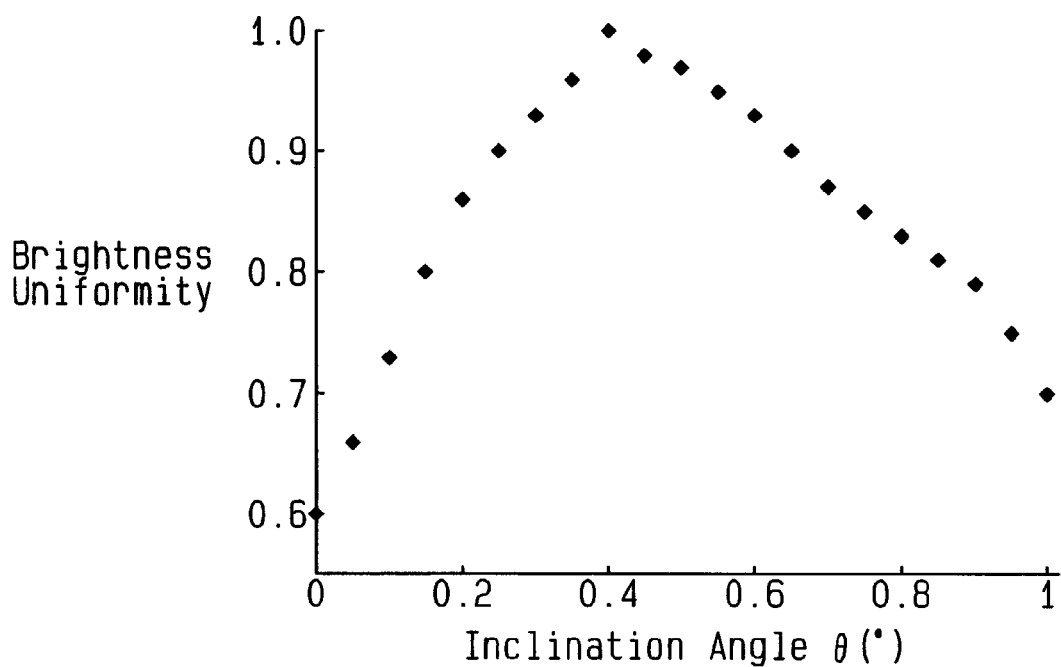
FIG. 3 is a graph showing the relationship between the brightness uniformity and the inclination angle θ.
Figure 4:
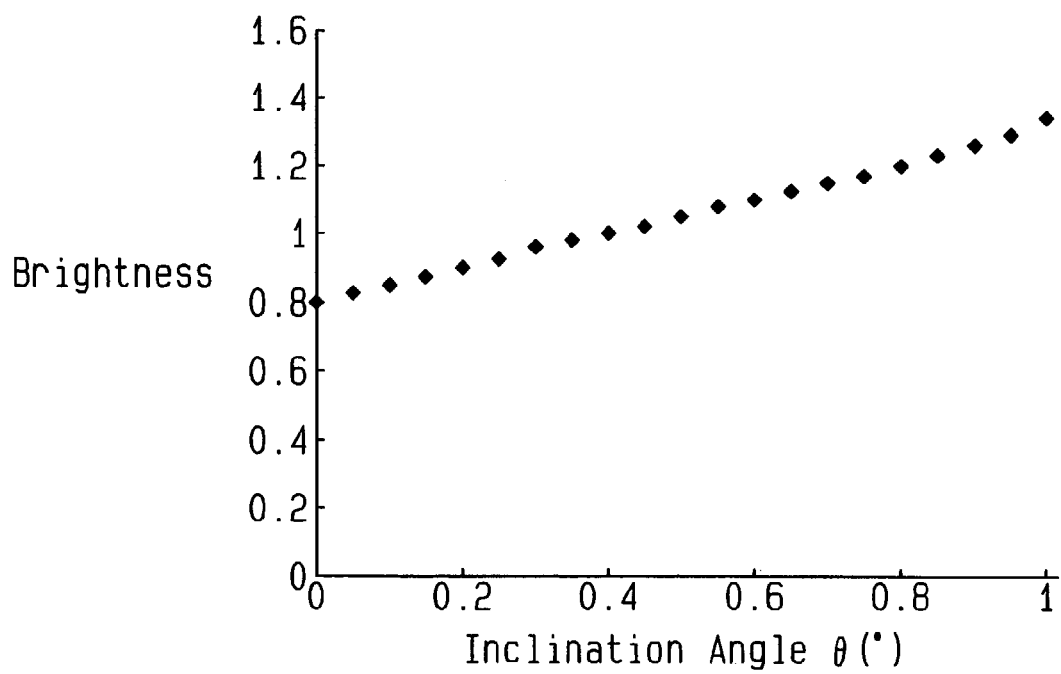
FIG. 4 is graph showing the relationship between the brightness and the inclination angle θ.
Figure 5A:
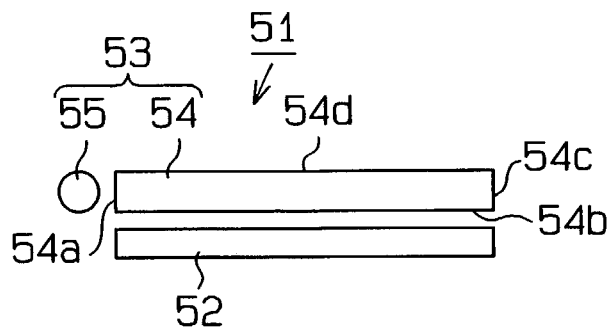
FIGS. 5(a) and 5(b) are diagrammatic side views showing prior art light guiding plates.
Figure 5B:
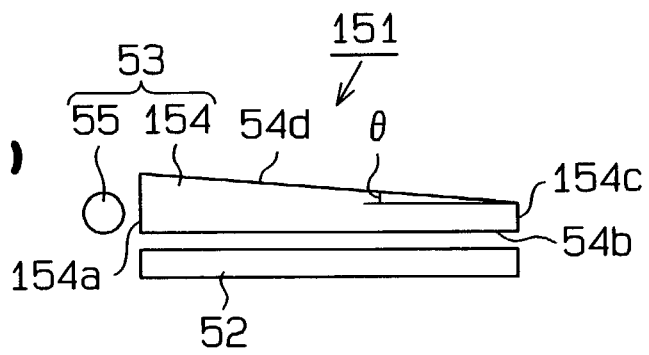
Figure 6:
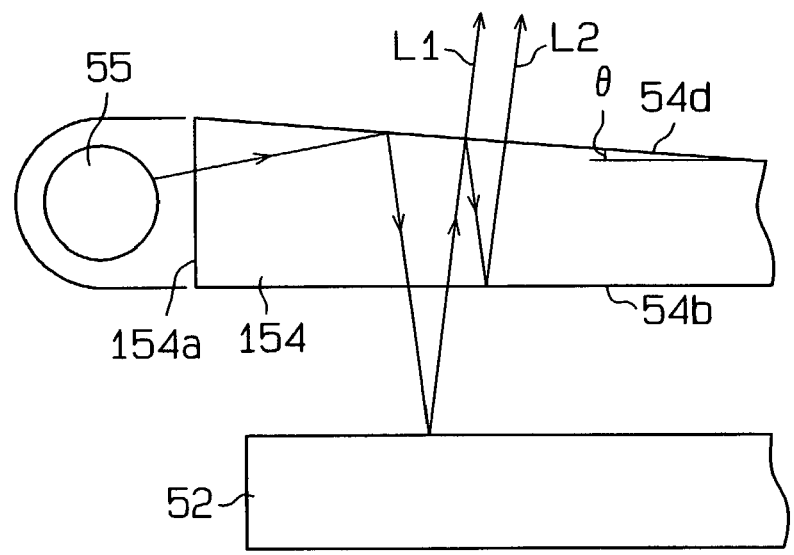
FIG. 6 is a partially diagrammatic view showing the mechanism of a double image.

The present inventors searched for an appropriate range of the inclination angle θ. FIGS. 3 and 4 show the results of the search. FIG. 3 shows the relationship between the brightness uniformity and the inclination angle θ, in which the brightness uniformity when the inclination angle θ is 0.4° is set as 1. FIG. 4 shows the relationship between the brightness and the inclination angle θ, in which the brightness when the inclination angle θ is 0.4° is set as 1.

As shown in FIG. 3, the brightness uniformity has a maximum value in relation with the inclination angle θ. There is thus an optimal value of the inclination angle θ at which the brightness distribution is uniformed. As shown in FIG. 4, the brightness increases as the inclination angle 0 increases. To set the range of the inclination angle θ to satisfy the inequality 0.2°<θ<0.75° increases the brightness while maintaining the uniformity of the brightness distribution. Particularly, when the inclination angle θ is 0.4° (θ=0.4°), the brightness uniformity is maximized, and the uniformity of the brightness distribution is optimal. When the inequality 0.2°<θ<0.75° is satisfied, the brightness uniformity is 85% of that when the inclination angle θ is 0.40°, and is sufficient for the practical use. If the range of the inclination angle θ is set to satisfy the inequality 0.3°<θ <0.6°, the brightness uniformity is over 93% of that when the inclination angle θ is 0.4°. Therefore, the brightness is more uniformed.

A sample was prepared as the light guiding plate 14. The sample was wedge plate type light guiding plate that had a length of 65 mm, a width of 80 mm, a maximum thickness d1 of 1 mm, a minimum thickness d2 of 0.7 mm, a pitch P of 0.24 mm, groove depths of 5.5 to 11 μm, and an inclination angle β of 44°. Another sample, which was the same as the first sample except that the thickness was 1 mm, was also prepared. The brightness and the brightness uniformity of the two samples were tested. When the brightness of the wedge plate type light guiding plate 14 was set as 1, the brightness of the flat type light guiding plate was 0.76. That is, the wedge type light guiding plate 14 had a significantly improved brightness. When the brightness uniformity of the wedge type light guiding plate 14 was set as 1, the brightness uniformity of the flat type light guiding plate was 0.68. That is, the wedge type light guiding plate had a significantly improved brightness uniformity. Also, it was confirmed that the parallax of the wedge plate type light guiding plate 14 was minimized to a level that is not noticeable. This improves the visibility.

This embodiment provides the following advantages.

(1) In a macroscopic view, the light guiding plate 14 is formed like a wedge so that the thickness gradually decreases from the incidence plane 14a to the opposite end plane 14b. Therefore, even if the depth of the grooves 17 formed in the reflection-exit plane 14d is set shallower than a case of a light guiding plate having a uniform thickness, a sufficient amount of brightness is obtained without making the grooves 17 visible.

(2) The inclination angle θ defined by the exit plane 14c and the line that contains the first and second ends of the reflection-exit plane 14d is greater than 0.2° and smaller than 0.75°. Therefore, parallax is minimized to a level that is not recognizable to improve the visibility of the display unit 11. This improves the brightness and its uniformity.

(3) Since the pitch P of the grooves 17 is set equal to the pixel pitch of the liquid crystal panel 12, interference patterns are not visible.

(4) The distance between the exit plane 14c and a point at which the inclined planes 17a, 17b of each groove 17 intersect decreases from the side of the incidence plane 14a toward the opposite end plane 14b. The amount of light that reaches a region far from the light source 15 is less that the amount of light that reaches a region close to the light source 15. However, due to the configuration of the grooves 17, the area of the second inclined planes 17b in the region far from the light source 15 is large. Thus, a relatively large amount of light is reflected and guided to the exit plane 14c in an angle nearly perpendicular to the exit plane 14c. Therefore, without changing the thickness or the light guiding plate 14 to a level that creates parallax, sufficient brightness and brightness uniformity are guaranteed at regions far from the light source 15.

It should be apparent to those skilled in the art that the present invention may be embodied in many other specific forms without departing from the spirit or scope of the invention. Particularly, it should be understood that the invention may be embodied in the following forms.

Figure 2:
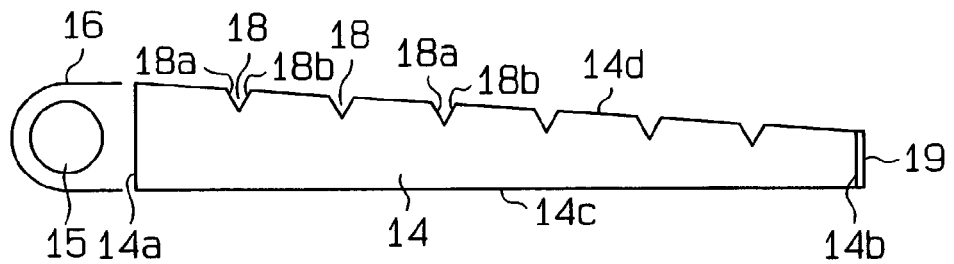
FIG. 2 is a diagrammatic side view showing a light guiding plate according to another embodiment of the present invention.

As the light admission portion, grooves 18 having V-shaped cross-section may be formed on the light guiding plate 14 as shown in FIG. 2 instead of saw-tooth shaped grooves. Each groove 18 is defined by a first inclined plane 18b and a second inclined plane 18a. The inclined planes 18b, 18a function as light admission planes. In each groove 1H, the second inclined plane 18a, which is closer to the incidence plane 14a, totally reflects light entering through or reflected on the incidence plane 14a and guides the light toward the exit plane 14c. The reflected light advances in a direction substantially perpendicular to the exit plane 14c and passes through the exit plane 14c. In each groove 10, the first inclined plane 18b, which is farther from the incidence plane 14a, totally reflects the light that has been reflected by the opposite end plane 14b and guides the light toward the exit plane 14c. The reflected light advances in a direction substantially perpendicular to the exit plane 14c and passes through the exit plane 14c. Therefore, the light reflected by the opposite end plane 14b is utilized. In other words, the light that enters the light guiding plate 14 is effectively emitted from the exit plane 14c, which improves the brightness.

The angle defined by the second inclined plane 18a and the exit plane 14c may be different from the angle defined by the first inclined plane 18b and the exit plane 14c.

As shown in FIG. 2, a reflector 19 may be located at the opposite end plane 14b of the light guiding plate 14 to reflect the light that reaches the opposite end plane 14b. The reflector 19 may be formed by evaporating aluminum or silver onto the opposite end plane 14b. Alternatively, the reflector 19 may be formed by attaching a reflector film (for example, a white polyester film) onto the opposite end plane 14b. The reflector 19 prevents light from escaping from the opposite end plane 14b. The light that enters the light guiding plate 14 is therefore effectively utilized. The advantages of the reflector 19 are more remarkable with the structure of the grooves 19 having V-shaped cross-section.

Instead of forming a reflector on the light guiding plate 14, a reflecting surface may be formed on a wall of a housing accommodating the light guiding plate 14 that faces the opposite end plane 14b.

The exit plane 14c of the light guiding plate 14 may be subjected to an antireflective treatment. The antireflective treatment is performed by conventional method, such as attaching of a film, vacuum deposition, a dip method, or thermal transfer method. The antireflective treatment improves the viewability of the image on the liquid crystal panel 12.

Instead of a transparent resin such as acrylic, inorganic glass may be used. However, a transparent resin is preferably used to reduce the weight and improve the workability The size of the light guiding plate 14 is not limited to the one tested in the above description. Specifically, the light guiding plate 14 is formed to have a size that corresponds to the size of the corresponding display unit (1 to 10 inches diagonally).

Instead of the grooves 17 or grooves 18, which function as light admission portions, a number of dots or recesses may be formed in the exit plane 14c and the reflection-exit plane 14d. In this case, the dots and the recesses have the triangular cross-sections.

The light source 15 is not limited to the cold cathode tube. A fluorescent tube such as a hot cathode tube or a light emitting diode may be used. Alternatively, a linear light source as the one disclosed in Japanese Laid-Open Patent Publication No. 2000-11723 may be used. The linear light source has a point light source such as LED and a light guiding body to convert the light from the light source to a linear light.

Instead of inclining the reflection-exit plane 14d, the exit plane 14c may be inclined. In this case, the reflection-exit plane 14d is parallel to the liquid crystal panel 12, and the incidence plane 14a is substantially perpendicular to the reflection-exit plane 14d. The exit plane 14c is inclined such that the exit plane 14c approaches the reflection-exit plane 14d from the surface facing the light source 15 (incidence plane 14a) to the opposite end plane 14b.

Therefore, the present examples and embodiments are to be considered as illustrative and not restrictive and the invention is not to be limited to the details given herein, but may be modified within the scope and equivalence of the

What is claimed is:

1. A light guiding plate for a front light mounted on a reflective display unit having a display portion, wherein the light guiding plate guides light from a light source and irradiates the light onto the display portion, the light guiding plate comprising:
   an incidence plane, which permits light to enter the light guiding plate; an opposite end plane opposite to the incidence plane;
   an exit plane facing the display portion, wherein light entering the light guiding plate through the incidence plane exits from the exit plane toward the display portion; and
   a reflection-exit plane opposite to the exit plane, wherein light reflected on the display portion passes through the exit plane and the reflection-exit plane, wherein the reflection-exit plane has a first end intersecting the incidence plane and a second end intersecting the opposite end plane, wherein
   an inclination angle defined by the exit plane and a line that contains the first end and the second end is greater than 0.20° and less than 0.75°, and wherein the reflection-exit plane includes a light admission portion that reflects light entering through or reflected on the incidence plane to the exit plane.

2. The light guiding plate according to claim 1, wherein at least one of the exit plane and the reflection-exit plane is subjected to an antireflective treatment.

3. The light guiding plate according to claim 1, wherein a plurality of grooves having a saw-tooth cross-section are formed on the reflection-exit plane, wherein each groove is defined by a first inclined plane and a second inclined plane, and wherein the second inclined plane functions as the light admission portion.

4. The light guiding plate according to claim 3, wherein each second inclined plane is inclined such that the distance between the second inclined plane and the exit plane decreases toward the opposite end plane.

5. The light guiding plate according to claim 3, wherein the grooves extend parallel to the incidence plane.

6. The light guiding plate according to claim 3, wherein the distance between the exit plane and a line on which each first inclined plane intersects the corresponding second inclined plane decreases toward the opposite end plane.

7. The light guiding plate according to claim 1, wherein a plurality of grooves each having a V shaped cross section are formed on the reflection-exit plane, wherein each groove is defined by a first inclined plane and a second inclined plane, and wherein the inclined planes function as the light admission portion.

8. The light guiding plate according to claim 7, wherein the grooves extend parallel to the incidence plane.

9. The light guiding plate according to claim 7, wherein a reflection portion is formed on the opposite end plane, and wherein the reflection portion reflects light entering the light guiding plate through the incidence plane.

10. The light guiding plate according to claim 9, wherein each first inclined plane reflects light reflected by the reflection portion toward the exit plane, and wherein each second inclined plane reflects light entering through or reflected on the incidence plane toward the exit plane.

11. A light guiding plate for a front light mounted on a reflective display unit having a display portion, wherein the light guiding plate guides light from a light source and irradiates the light onto the display portion, the light guiding plate comprising:
    an incidence plane, which permits light to enter the light guiding plate; an opposite end plane opposite to the incidence plane;
    an exit plane facing the display portion, wherein light entering the light guiding plate through the incidence plane exits from the exit plane toward the display portion; and
    a reflection-exit plane opposite to the exit plane, wherein light reflected on the display portion passes through the exit plane and the reflection-exit plane, wherein the reflection exit plane has a first end intersecting the incidence plane and a second end intersecting the opposite end plane, wherein
    an inclination angle defined by the exit plane and a line that contains the first end and the second end is greater than 0.20° and less than 0.75°, wherein a plurality or light admission planes are formed on the reflection-exit plane the light admission planes defining grooves, and wherein each light admission plane reflects light entering through or reflected on the incidence plane toward the exit plane.

12. The light guiding plate according to claim 11, wherein at least one of the exit plane and the reflection-exit plane is subjected to an antireflective treatment.

13. The light guiding plate according to claim 11, wherein the grooves have a saw-tooth cross-section, wherein each groove is defined by a first inclined plane and a second inclined plane, wherein the light admission planes function as the second inclined planes, and wherein each second inclined plane is inclined such that the distance between the second inclined plane and the exit plane decreases toward the opposite end plane.

14. The light guiding plate according to claim 13, wherein the grooves extend parallel to the incidence plane.

15. The light guiding plate according to claim 13, wherein the distance between the exit plane send a line on which each first inclined plane intersects the corresponding second inclined plane decreases from the side of the incidence plane toward the opposite end plane.

16. The light guiding plate according to claim 11, wherein each groove has a V-shaped cross-section, wherein each groove is defined by a first inclined plane and a second inclined plane, and wherein the light admission planes function as the second inclined planes.

17. The light guiding plate according to claim 16, wherein the grooves extend parallel to the incidence plane.

18. The light guiding plate according to claim 16, wherein a reflection portion is formed on the opposite end plane, and wherein the reflection portion reflects light entering the light guiding plate through the incidence plane.

19. The light guiding plate according to claim 18, wherein each first inclined plane reflects light reflected by the reflection portion toward the exit plane, and wherein each second inclined plane reflects light entering through or reflected on the incidence plane toward the exit plane.

* * * * *

UNITED STATES PATENT AND TRADEMARK OFFICE
CERTIFICATE OF CORRECTION

PATENT NO. : 6,969,187 B2
APPLICATION NO. : 10/304623
DATED : November 29, 2005
INVENTOR(S) : Eiki Niida et al.

It is certified that error appears in the above-identified patent and that said Letters Patent is hereby corrected as shown below:

Column 2, line 62, please delete "FIG. 4 is graph" and insert therefore -- FIG. 4 is a graph --

Column 3, line 21, please delete "acrylic sheet" and insert therefore -- acrylic sheet, --
    line 33, please delete "which face" and insert therefore -- which faces --
    line 36, please delete "as first end" and insert therefore -- as a first end --
    line 51, please delete "increased" and insert therefore -- increases --
    line 55, please delete "decrease" and insert therefore -- decreases --
    line 64, please delete "a fight" and insert therefore -- a right --

Column 6, line 12, please delete "thickness or" and insert therefore -- thickness of --
    line 28, please delete "1H" and insert therefore -- 18 --
    line 33, please delete "groove 10" and insert therefore -- groove 18 --
    line 59, please delete "grooves 19" and insert therefore -- grooves 18 --

Column 7 line 36, at the end, please insert --appended claims. --

Claim 1 at column 7, line 58, please delete "0.20°" and insert therefore -- 0.2° --

Claim 11 at column 8, line 53, please delete "0.20°" and insert therefore -- 0.2° --

Claim 15 at column 9, line 6, please delete "send" and insert therefore -- and --

Signed and Sealed this

Twenty-fourth Day of April, 2007

JON W. DUDAS
*Director of the United States Patent and Trademark Office*